H. A. WHITING.
Improvement in Process and Apparatus for the Manufacture of Sulphate of Lead.
No. 125,153.            Patented April 2, 1872.
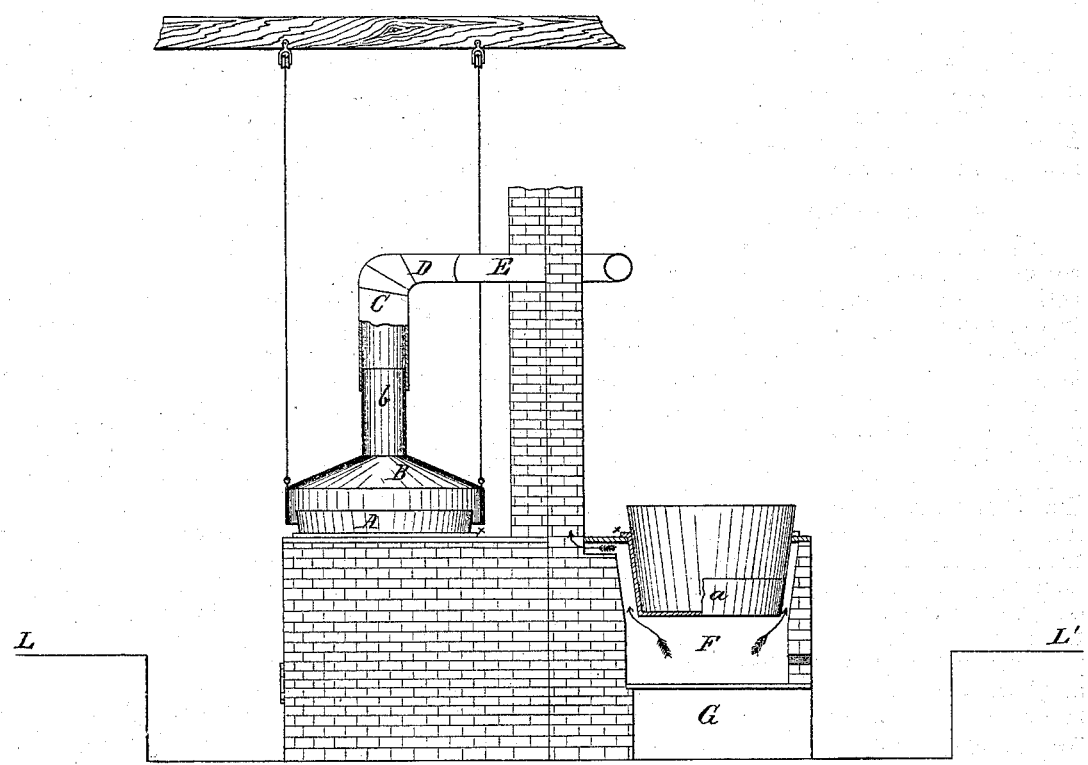
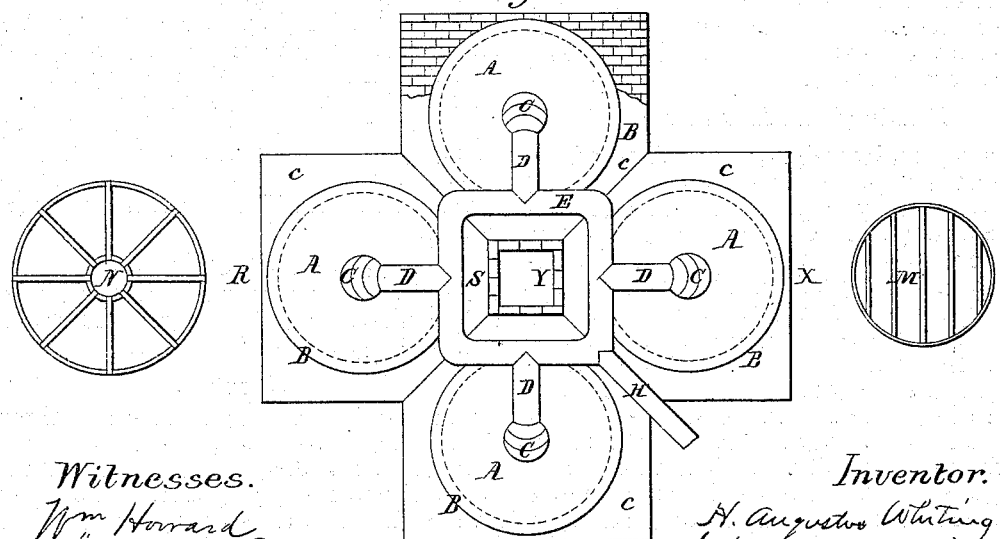

UNITED STATES PATENT OFFICE.

H. AUGUSTUS WHITING, OF SAN FRANCISCO, CALIFORNIA.

IMPROVEMENT IN PROCESSES AND APPARATUS FOR THE MANUFACTURE OF SULPHATE OF LEAD.

Specification forming part of Letters Patent No. 125,153, dated April 2, 1872.

I, H. AUGUSTUS WHITING, of San Francisco, county of San Francisco, State of California, have invented a certain Process for the Manufacture of Sulphate of Lead, of which the following is a specification:

Nature and Objects of my Invention.

The nature of the first part of my invention consists in inducing a complete and rapid reaction between metallic lead (Pb) and concentrated sulphuric acid ($SO_3$, Ho) through the intermediary agency of metallic zinc. The lead may be in the form either of thin bars, or sheets, or strips, and coils, &c., as may be found most convenient. The zinc is to be alloyed with the lead in the proportion of one per cent. by weight.

The second part of my invention consists in the use and arrangement of the apparatus hereinafter to be described, and whose object is, threefold, to wit: First, to heat the sulphuric acid together with the zinc-lead; and with, second, the least expenditure of time and labor; third, to conduct the fumes (consisting of sulphurous acid and some sulphuric acid) into sulphuric-acid chambers, where they can be reconverted into sulphuric acid, which can be used again in subsequent operations.

The object of my invention is to substitute the use and manufacture of the innocuous sulphate of lead as a paint for that of the exceedingly-poisonous carbonate of lead, commonly known as "white lead."

Details of the Manufacture.

To one part, by weight, of the zinc-lead (alloyed in the proportion hereinbefore described) add two parts, by weight, of concentrated sulphuric acid, (66° Baumé,) and place the two into the porcelain "pot," hereinafter to be described. Then light a fire upon the grate of the furnace, and, having lowered the "hood" to within about three (3) inches of the iron plate on the top of the furnace, heat the contents of the "pot" gradually to the boiling-point of sulphuric acid, (326° centigrade or 620° Fahrenheit.) In from twenty (20) to thirty (30) minutes the reaction will take place rapidly and with quite violent ebullition. In a few minutes after the reaction will be completed, and all the lead in the pot will have combined with the sulphuric acid to form sulphate of lead, which latter will remain as a more or less dingy white residue within the pot. The fire must now be withdrawn, and the pot and its contents allowed to cool during about half an hour to one hour. Add, now, clear water, with great caution at first, and in very small quantities, until all violent "spitting" or bubbling ceases; afterward in larger quantities, until the pot is filled to within about eight (8) inches of the top. The workman then stirs the contents of the pot for, say, ten (10) minutes with wooden ladles covered with sheet lead, and at the end of that time the sulphate of lead is allowed to settle. As soon as the supernatant liquor becomes clear it is to be drawn off, as far as practicable, through glass siphons, and the sulphate of lead is to be then transferred to wooden vats which are lined with lead, and then washed several times with clear water—stirring well each time with the ladles—until the "washings" no longer taste acid to the tongue. When well "washed" the sulphate of lead is to be taken out of the "vats" and placed in a number of clean clay molds, (similar to the French "scorifiers" used in assaying,) and transferred to a "drying-room," in which a constant temperature of about 185° Fahrenheit is maintained. When well dried from all perceptible moisture, the molds with their contents are to be placed in a "muffle-furnace," and calcined at a red heat for about half an hour. At the close of this operation the "cakes" of sulphate of lead will be ready for the subsequent operations of "grinding," mixing with oil, &c., which operations are to be conducted in the same manner as in the corresponding stages in the preparation of carbonate of lead ("white lead") for the market.

Description of Drawing.

The furnaces are arranged in a group of four, (4,) as shown in the "plan," for convenience and economy of time and labor.

Elevation.

One-half the "elevation" is a section through the line $x\ y$ in the "plan," and shows the position and manner of setting the pots, so that the heat and flame may play around the cast-iron "tub." The tubs are seen supported by a cast-iron flange, which rests upon the iron plate on top of the furnace.

A A A A are the porcelain "pots," setting within the cast-iron "tubs." B is a section through R S in the "plan," and shows the interior of the "hood." b is a pipe forming a continuation of hood B. The pulley arrangements in the drawing have been turned ninety degrees from their true position, in order to show more distinctly the method of suspending the "hood" so that it may slide within the iron pipe C. C is a cast-iron pipe, leading through the leaden pipe D into the leaden collection-pipe E. From E another leaden pipe, H, conveys the fumes to acid-chambers. These pipes are all to be suspended from "girders" by means of stout iron wires. a in the section shows one-quarter ($\frac{1}{4}$) of the exterior surface of the cast-iron "tub," which is only cast to the height of one (1) foot from the bottom, thus leaving the upper portion of the porcelain pot exposed to the direct action of the heat. The "tub" is made with the circular flange shown in the accompanying drawing, and the top of the solid surface of the "tub" is connected with the flange by means of four (4) bars of four (4) inches width. The bars, flange, &c., are all made in one casting. F is the fire-place. G is the ash-pit. L L' is the "ground line," showing the floor of the establishment.

Plan.

A portion of the iron plate c has been removed from the top of one of the furnaces, showing the brick-work beneath. H is a leaden pipe conveying the fumes from E to the acid-chambers. M shows the bottom of a cast-iron "tub," as made with open bars instead of being cast solid. N shows the frame-work of the "hood." This hood is of lead, and is constructed by forming a frame-work of scantling or other suitable material, and is of circular or other desired form, and has a central orifice for the passage of the pipe b, through which the fumes escape. It is dished to allow the hood to assume the form of a dome. To this frame the sheet-lead is fastened and all seams soldered, thus making a hood adapted to withstand corrosion. This frame-work is to be lined in the interior with sheet-lead.

The furnaces can be built of a good quality of brick in all parts save the grate; this should be built of good fire-brick.

Claims.

What I claim as my invention, and desire to secure by Letters Patent, is—

1. The process of manufacturing sulphate of lead, in the manner hereinbefore described—viz., by the direct action of hot concentrated sulphuric acid upon an alloy of lead and zinc.
2. The process of calcining the sulphate of lead, in order to transform it into a perfectly white and marketable article, as hereinbefore set forth and described.
3. The iron tubs, constructed as hereinbefore described and represented in the drawing.
4. The porcelain pots, in combination with the iron tubs, for the purpose herein set forth, and in the manner described.
5. The leaden hood and attachments, constructed as herein set forth and described, and for the purposes herein stated.
6. The combination of the leaden hood with the iron pipe C, in the manner and for the purpose herein described and set forth.

H. AUGUSTUS WHITING.

Witnesses:
J. H. PURDY,
E. L. TAYLOR.